United States Patent
Ohata et al.

(10) Patent No.: US 6,556,427 B2
(45) Date of Patent: Apr. 29, 2003

(54) SOLID ELECTROLYTIC CAPACITOR AND METHOD FOR PRODUCING THE SAME

(75) Inventors: Hideki Ohata, Chiba (JP); Ryuji Monden, Nagano (JP); Atsushi Sakai, Nagano (JP)

(73) Assignee: Showa Denko Kabushiki Kaisha, Tokyo (JP)

( * ) Notice: Subject to any disclaimer, the term of this patent is extended or adjusted under 35 U.S.C. 154(b) by 3 days.

(21) Appl. No.: 09/818,530

(22) Filed: Mar. 28, 2001

(65) Prior Publication Data

US 2002/0001168 A1 Jan. 3, 2002

Related U.S. Application Data

(60) Provisional application No. 60/244,879, filed on Nov. 2, 2000.

(30) Foreign Application Priority Data

Mar. 28, 2000 (JP) ........................................ 2000-089092

(51) Int. Cl.$^7$ .................................................. H01G 9/00
(52) U.S. Cl. ........................ 361/523; 361/528; 361/508; 361/509; 29/25.03
(58) Field of Search ................................. 361/523, 525, 361/524, 528, 532, 535, 526, 501, 508, 540, 509, 502, 512; 29/25.03

(56) References Cited

U.S. PATENT DOCUMENTS

| | | | | |
|---|---|---|---|---|
| 3,581,159 A | * | 5/1971 | John et al. ................... 317/230 |
| 4,639,836 A | * | 1/1987 | Crowley, Jr. ................. 361/433 |
| 5,019,949 A | * | 5/1991 | Ikeda et al. .................. 361/525 |
| 5,122,931 A | * | 6/1992 | Shimada et al. ............. 361/523 |
| 4,017,773 A | * | 4/1997 | Cheseldine .................. 361/433 |
| 5,972,052 A | * | 10/1999 | Kobayashi et al. ......... 29/25.03 |
| 6,042,740 A | * | 3/2000 | Uehara et al. .............. 252/62.2 |
| 6,128,180 A | * | 10/2000 | Araki et al. .................. 361/525 |
| 6,215,651 B1 | * | 4/2001 | Takada et al. ............... 361/523 |
| 6,229,689 B1 | * | 5/2001 | Kobayashi et al. .......... 361/525 |
| 6,351,370 B1 | * | 2/2002 | Konuma et al. ............. 361/523 |
| 6,381,121 B1 | * | 4/2002 | Monden et al. .............. 361/525 |

FOREIGN PATENT DOCUMENTS

| | | |
|---|---|---|
| JP | 61-69853 | 4/1986 |
| JP | 62-08513 | 1/1987 |
| JP | 2-015611 | 1/1990 |
| JP | 2-260525 | 10/1990 |
| JP | 4-177802 | 6/1992 |
| JP | 4-181607 | 6/1992 |
| JP | 5-007078 | 1/1993 |
| JP | 7-262822 | 10/1995 |
| JP | 9-031402 | 2/1997 |
| JP | 10-032145 | 2/1998 |

* cited by examiner

*Primary Examiner*—Dean A. Reichard
*Assistant Examiner*—Nguyen T Han
(74) *Attorney, Agent, or Firm*—Sughrue Mion, PLLC

(57) ABSTRACT

An object of the present invention is to improve the adhesive property of the solid electrolyte of a solid electrolytic capacitor where a solid electrolyte layer has an electrically conducting polymer to provide a solid electrolytic capacitor favored with mechanical strength, high capacitance, low impedance, good humidity resistance load characteristics and excellent heat resistance. The present invention provides a solid electrolytic capacitor having a dielectric film on the surface of a valve-acting metal having fine pores, a solid electrolyte layer, an electrically conducting carbon paste layer and an electrically conducting metal powder paste layer in order. The binder of the electrically conducting carbon paste is allowed to infiltrate into the solid electrolyte layer formed on the dielectric film on the surface of the valve-acting metal or into the solid electrolyte layer and the inside of the fine pores. The present invention also provides a method for producing the capacitor.

18 Claims, 2 Drawing Sheets

SOLID ELECTROLYTIC CAPACITOR AND METHOD FOR PRODUCING THE SAME

CROSS REFERENCE TO RELATED APPLICATIONS

This application is an application filed under 35 U.S.C. §111(a) claiming benefit pursuant to 35 U.S.C. §119(e)(1) of the filing date of Provisional Application No. 60/244,879 filed Nov. 2, 2000 pursuant to 35 U.S.C. §111(b).

FIELD OF THE INVENTION

The present invention relates to a solid electrolytic capacitor containing an electrically conducting carbon paste favored with good filling property and high electrical conductivity, having heat resistance, small in thermal deterioration, and high in the humidity resistance. More specifically, the present invention relates to a solid capacitor obtained by forming a solid electrolyte layer on a dielectric film on the surface of a valve-acting metal having fine pores and forming further thereon an electrically conducting carbon paste layer and an electrically conducting metal powder paste layer. The binder of the electrically conducting carbon paste is allowed to infiltrate into the inside of the solid electrolyte layer or into both the inside of the solid electrolyte layer and the inside of fine pores, so that the solid electrolytic capacitor can be improved in the adhesion between the electrically conducting material with the dielectric film and the solid electrolyte layer and can have mechanical strength, high capacitance, low impedance, good humidity resistance load property and excellent heat resistance. The present invention also relates to a method for producing the solid electrolytic capacitor.

BACKGROUND OF THE INVENTION

A solid electrolytic capacitor device is generally manufactured by forming an oxide dielectric film layer on an anode substrate comprising a metal foil subjected to an etching treatment to have a large specific area, forming on the outer side thereof a solid semiconductor layer (hereinafter simply referred to as a "solid electrolyte") as a counter electrode, and preferably further forming an electrically conducting layer such as electrically conducting paste. After completely sealing the whole device with epoxy resin or the like, the device is used as a capacitor part for electric products in a wide range of fields.

In recent years, to satisfy the requirements for digitization of electric instruments or higher processing speed of personal computers, there has been a demand for the solid electrolytic capacitor to have a small size, a large capacity and low impedance characteristics in the high frequency region.

To cope with these requirements for the solid electrolytic capacitor, an electrically conducting polymer is applied as the solid electrolyte, thereby bringing out a great effect on the improvement of capabilities of the capacitor device. However, this is still insufficient and there is a demand for the electrically conducting paste covering the outer surface of the solid electrolyte of a capacitor device to have improved capabilities.

The electrically conducting material in the electrically conducting paste used in a solid electrolytic capacitor is a metal powder such as gold, silver or copper. Among these, silver powder is widely used in view of capability. However, silver causes migration and therefore, when it is used, for example, for a solid electrolytic capacitor, it is necessary to previously coat an electrically conducting carbon paste and coat thereon the electrically conducting silver paste.

A large number of proposals have been made with respect to the electrically conducting material, binder and solvent constituting the electrically conducting carbon paste.

With respect to the electrically conducting material for the electrically conducting carbon paste, for example, use of a combination of natural graphite (10 to 20 µm) and carbon black (see, JP-A-9-31402 (the term "JP-A" as used herein means an "unexamined published Japanese patent application")), use of carbon having a particle size of tens of microns with an attempt to bring out an anchoring effect by the particles projecting from the electrically conducting carbon layer (see, JP-A-5-7078), use of carbon black of 20 µm or less and a synthetic resin as a combination of electrically conducting material and binder (see, JP-A-4-181607), use of graphite powder flake, graphite fine powder (aspect ratio: 10 or more, average particle size: 10 µm or less) and epoxy resin (see, JP-A-7-262822), use of graphite and a fluorine-containing polymer such as PTFE fine particle (see, JP-A-61-69853), and use of carbon powder and a glycidyl ether as a combination of electrically conducting material and solvent (see, JP-A-4-177802) have been proposed.

For the synthetic resin as the binder, polyethylene, epoxy resin and phenol resin have been proposed.

In electrically conducting carbon pastes used in over a wide range of fields, the above-described natural graphite or carbon black is used and epoxy resin is used as the binder.

However, the electrically conducting carbon paste using natural graphite has problems in that the filling property (adhesive property) is bad because the natural graphite is in the scale form. In addition, the electrical conductivity is low due to the presence of many impurities, and since the surface after the coating has little asperities, layer separation readily occurs at the interface or the impedance easily deteriorates by heat.

The electrically conducting carbon paste using carbon black has similar problems as in the case using natural graphite. That is, the filling property cannot be increased because the powder particle is very small and therefore, the electric conductivity cannot be elevated. Furthermore, another problem with the electrically conducting carbon paste using natural graphite or carbon black is that a dispersion treatment is necessary in the manufacture of the paste.

On the other hand, the epoxy resin is advantageous when used as the binder because the cost is low and the handling is easy; however, there still is a problem, such as high rigidity, low capability of relaxing the reduction in the stress generated between the chip and the lead frame at the heating in the reflow soldering treatment, which is attributable to the formation of a large-size chip, and easy occurrence of deterioration in the moisture resistance due to high water absorptivity.

With respect to the improvement of the adhesive property between the solid electrolyte and the electrically conducting paste layer, a solid electrolytic capacitor comprising a valve-acting metal anode having formed thereon an oxide film layer, a semiconductor layer, an electrically conducting carbon layer comprising a non-aqueous resin, a heat-sensitive inorganic powder and an electrically conducting carbon powder and a cathode electrically conducting layer in this order has been proposed (see, JP-A-62-8513). In this case, strong adhesion is achieved between the non-aqueous resin containing electrically conducting carbon powder and the manganese dioxide layer as the solid electrolyte. Therefore, the impedance can be prevented from increasing in the tests of moisture resistance and heat resistance.

Furthermore, JP-A-2-260525 describes a method for producing a solid electrolytic capacitor, where chemically formed foils (anode foil and cathode foil) each having a surface oxide film formed by electrolytic oxidation are used. A polypyrrole polymerization film is formed by chemical polymerization and electrolytic polymerization on the anode foil and the cathode foil, these foils are coiled through a porous separator, an electrically conducting paste is impregnated into the porous separator to manufacture a device, and the device is sealed to obtain a product. In this case, the polypyrrole polymerization film is contacted with the porous separator impregnated with the electrically conducting paste over a wide area, so that the strength is improved and so that a problem in the reliability due to uncertainty in the adhered area, which is encountered in the case of using an electrically conducting paste and taking out the cathode, can be overcome.

According to the technique described in JP-A-62-8513, by virtue of the strong adhesion between the non-aqueous resin containing electrically conducting carbon powder and the manganese dioxide layer as the solid electrolyte, the impedance can be prevented from increasing in the tests of moisture resistance and heat resistance. However, the solid electrolyte is limited to manganese dioxide and in the case of a solid electrolytic capacitor using an electrically conducting polymer as the solid electrolyte, sufficiently strong adhesion is not guaranteed.

According to the technique described in JP-A-2-260525, it is necessary to use a porous separator and at the same time allow the polypyrrole polymerization film to contact the porous separator impregnated with an electrically conducting paste over a wide area, and in this technique, the adhesive property is not referred to except for the contact area.

The present inventors have found that in a solid electrolytic capacitor obtained by forming an electrically conducting polymer as a solid electrolyte layer on a dielectric film on the surface of a valve-acting metal having fine pores and forming thereon an electrically conducting carbon paste layer and an electrically conducting metal powder paste layer, the adhesion to the electrically conducting metal material layer and the adhesion between the dielectric film and the solid electrolyte are improved and a high-performance solid electrolytic capacitor can be obtained when the binder of the electrically conducting carbon paste is allowed to infiltrate into the inside of fine pores and into the solid electrolyte layer formed thereon and particularly when a material having rubber elasticity is used as the binder component. The present invention has been accomplished based on this finding.

SUMMARY OF THE INVENTION

More specifically, the present invention provides a solid electrolytic capacitor and a production method therefor described below.

(1) A solid electrolytic capacitor comprising a dielectric film on the surface of a valve-acting metal having fine pores, a solid electrolyte layer, an electrically conducting carbon paste layer and an electrically conducting metal powder paste layer in order, wherein the binder of the electrically conducting carbon paste is allowed to infiltrate into the solid electrolyte layer.

(2) A solid electrolytic capacitor comprising a dielectric film on the surface of a valve-acting metal having fine pores, a solid electrolyte layer, an electrically conducting carbon paste layer and an electrically conducting metal powder paste layer in order, wherein the binder of the electrically conducting carbon paste is allowed to infiltrate into the solid electrolyte layer and into the inside of the fine pores of the valve-acting metal.

(3) The solid electrolytic capacitor as described in (1) or (2) above, wherein the binder of the electrically conducting carbon paste comprises a material which is softened at a temperature of 330° C. or less, can swell or suspend in the solvent of the paste and has rubber elasticity.

(4) The solid electrolytic capacitor as described in (3) above, wherein the material having rubber elasticity is at least one material selected from the group consisting of isoprene rubber, butadiene rubber, styrene/butadiene rubber, nitrile rubber, butyl rubber, ethylene/propylene copolymer, acrylic rubber, polysulfide rubber, fluorine-containing polymer, silicone rubber and thermoplastic elastomer.

(5) The solid electrolytic capacitor as described in any one of (1) to (4) above, wherein the electrically conducting carbon paste comprises solid contents consisting of from 30 to 99% by mass of the electrically conducting material and from 1 to 70% by mass of the binder.

(6) The solid electrolytic capacitor as described in (5) above, wherein the electrically conducting material is a material containing 80% by mass or more of artificial graphite.

(7) The solid electrolytic capacitor as described in (6) above, wherein the artificial graphite has a fixed carbon content of 97% by mass or more, an average particle size of 1 to 13 μm and an aspect ratio of 10 or less, and contains 12% by mass or less of particles having a particle size of 32 μm or more.

(8) The solid electrolytic capacitor as described in any one of (1) to (7) above, wherein at least a part of the solid electrolyte layer has a lamellar structure.

(9) The solid electrolytic capacitor as described in (8) above, wherein the solid electrolyte layer has a space portion at least in a position between layers of the lamellar structure.

(10) The solid electrolytic capacitor as described in (8) or (9) above, wherein the solid electrolyte having a lamellar structure has a thickness of 0.1 to 0.3 μm per layer.

(11) The solid electrolytic capacitor as described in any one of (1) to (10) above, wherein the valve-acting metal is selected from the group consisting of aluminum, tantalum, niobium, titanium, zirconium and alloys thereof.

(12) The solid electrolytic capacitor as described in any one of (1) to (11) above, wherein the solid electrolyte layer comprises an electrically conducting polymer and a monomer for forming the electrically conducting polymer is a compound containing a 5-membered heterocyclic ring.

(13) The solid electrolytic capacitor as described in any one of (1) to (11) above, wherein the solid electrolyte layer comprises an electrically conducting polymer and a monomer for forming the electrically conducting polymer is a compound having an aniline skeleton.

(14) The solid electrolytic capacitor as described in (12) above, wherein the compound containing a 5-membered heterocyclic ring is a compound selected from the group consisting of pyrrole, thiophene, furan, polycyclic sulfide and substitution derivatives thereof.

(15) The solid electrolytic capacitor as described in (14) above, wherein the compound containing a 5-membered heterocyclic ring is a compound represented by the following formula (I):

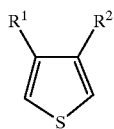

(wherein the substituents $R^1$ and $R^2$ each independently represents a monovalent group selected from the group consisting of hydrogen, a linear or branched, saturated or unsaturated hydrocarbon group having from 1 to 10 carbon atoms, an alkoxy group, an alkyl ester group, a halogen, a nitro group, a cyano group, a primary, secondary or tertiary amino group, $CF_3$, a phenyl group and a substituted phenyl group; the hydrocarbon chains of $R^1$ and $R^2$ may combine with each other at an arbitrary position to form a divalent chain for forming at least one 3-, 4-, 5-, 6- or 7-membered saturated or unsaturated hydrocarbon ring structure together with the carbon atoms to which those hydrocarbon groups are substituted, and the ring connecting chain may arbitrarily contain a bond of carbonyl, ether, ester, amide, sulfido, sulfinyl, sulfonyl or imino).

(16) The solid electrolytic capacitor as described in (15) above, wherein the compound containing a 5-membered heterocyclic ring is a compound selected from the group consisting of 3,4-ethylenedioxythiophene and 1,3-dihydroisothianaphthene.

(17) A method for producing a solid electrolytic carbon capacitor, comprising the steps of forming a dielectric film on the surface of a valve-acting metal having fine pores; forming a solid electrolyte layer on the dielectric film; forming an electrically conducting carbon paste layer comprising an electrically conducting carbon material, a binder capable of being softened at a temperature of 330° C. or less and having a rubber elasticity, and a solvent and an electrically conducting metal powder paste layer.

(18) The method for producing a solid electrolytic capacitor described in (17) above, further comprising the step of allowing the binder of the electrically conducting carbon paste to infiltrate into the solid electrolyte layer.

(19) The method for producing a solid electrolytic capacitor described in (17) above, further comprising the step of allowing the binder of the electrically conducting carbon paste to infiltrate into the solid electrolyte layer and into the inside of fine pores of the valve-acting metal.

DESCRIPTION OF THE PREFERRED EMBODIMENTS

Figure 1:
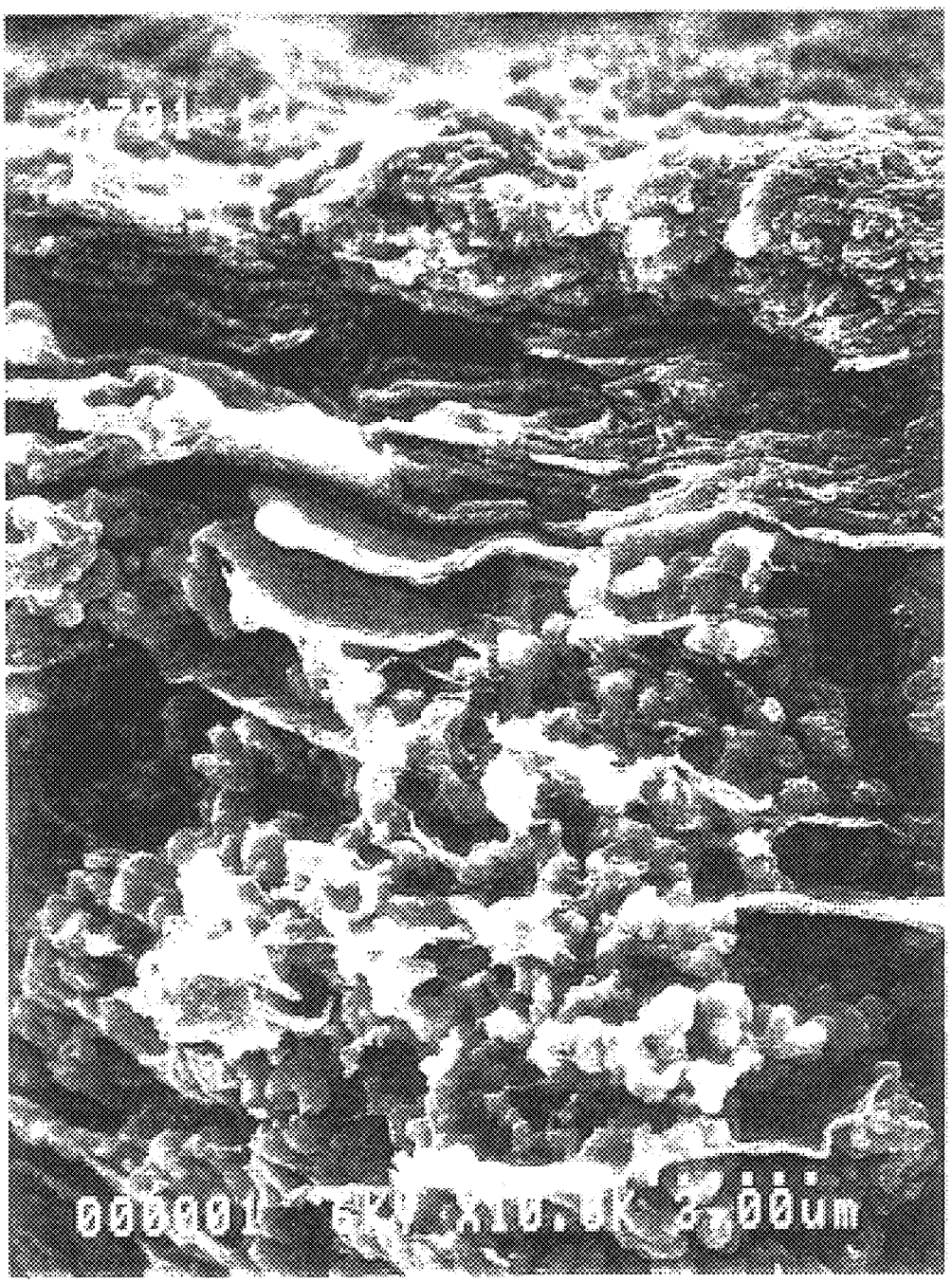
FIG. 1 is a SEM photograph (×10,000) showing the lamellar structure of the solid electrolyte layer.

For the anode of a solid electrolytic capacitor of the present invention, a single metal having a valve action, such as aluminum, tantalum, niobium, titanium or zirconium, or an alloy thereof, may be used after an etching treatment in the case of a metal foil or a sintering treatment in the case of fine powder to increase the surface area.

In the present invention, the dielectric film is produced by chemically forming a porous article of a metal having a valve action. The conditions in the chemical forming treatment, such as forming solution and forming voltage, can be freely selected and set according to the capacitance, voltage resistance and the like necessary for the solid electrolytic capacitor manufactured.

In the present invention, the pore shape and the pore distribution of the dielectric film porous body on the metal surface cannot be indiscriminately specified because these vary according to the production method, such as etching conditions, chemical forming voltage, kind of chemical forming solution, and current density. These also have close relationship with the surface tension and the like of the binder in the softened state; however, a structure that does not prevent the binder to infiltrate into the porous body (inside of pores) may be used.

The electrically conducting carbon paste for use in the present invention is mainly constructed by carbon as an electrically conducting material, a binder and a solvent.

The carbon preferably comprises a material containing at least 80% by mass or more of artificial graphite powder. If natural graphite or carbon black is used to reduce the artificial graphite powder to less than 80% by mass, the electrically conducting carbon paste obtained cannot be ensured to have a sufficiently high electrical conductivity. The amount of the artificial graphite powder used in the electrically conducting carbon material is preferably 95% by mass or more, more preferably 100% by mass. The balance of the electrically conducting carbon paste is a metal powder such as silver, gold and copper, or a powder of carbon black, natural graphite or other electrically conducting substances.

The artificial graphite may suffice if it is a material that does not prevent the binder from infiltrating into the inside of the solid electrolyte layer and into the inside of fine pores of the valve-acting metal. However, the artificial graphite preferably has a fixed carbon content of 97% by mass, an average particle size of 1 to 13 $\mu$m and an aspect ratio of 10 or less and contains 12% by mass or less of particles having a particle size of 32 $\mu$m or more.

Scaly or foliar natural graphite differs from the electrically conducting material (artificial graphite) for use in the present invention from the point that the aspect ratio is always 10 or more. As the aspect ratio of the artificial graphite is larger, the filling property of the electrically conducting carbon paste decreases. Therefore, in order to increase the electric resistance of the paste, the aspect ratio must be 10 or less. Such artificial graphite is advantageous in that the purity is high compared with natural graphite or carbon black, the filling ratio can be elevated and the thermal deterioration takes place to a small extent. However, any artificial graphite can be used as long as it has properties and a structure that does not inhibit the binder from infiltrating into the inside of the solid electrolyte layer and into insides of the fine pores of the valve-acting metal.

The fixed carbon content of the graphite moiety has an effect on the electric resistance of the paste and as the fixed carbon content in the artificial graphite powder is higher, the resistance value can be more decreased. However, similar to the above, the fixed carbon content may be sufficient if it does not inhibit the binder from infiltrating into the inside of the solid electrolyte layer and into the insides of fine pores of the valve-acting metal.

Accordingly, in order to achieve the objects of the present invention, an artificial graphite powder having a fixed carbon content of 97% by mass or more is preferably used. The "fixed carbon content" as used herein means a value as a standard for the carbon content and can be measured by JIS method (JIS K2425), Tanso Kyokai (Carbon Society) method, ASTM method or BS method.

The average particle size of the artificial graphite powder is preferably from 1 to 13 μm to obtain uniform coatability of the electrically conducting carbon paste. However, the average particle size may be sufficient if it does not inhibit the binder from infiltrating into the inside of the solid electrolyte layer and into the insides of fine pores of the valve-acting metal. When the average particle size of the artificial graphite used exceeds 13 μm, a uniform paste layer may not be obtained. If such an artificial graphite powder is used, the dielectric loss (tan δ) and equivalent series resistance (ESR) of the capacitor characteristics may change for the worse. Even when the average particle size is in the range of 1 to 13 μm, if coarse particles are contained in a large amount, uniform coating may not be attained. This problem does not occur when the content of particles having a particle size of 32 μm or more is suppressed to 12% by mass or less.

The binder (binder or cohering agent) of the electrically conducting carbon paste is a component used to strongly bond/fix a large amount of solid particles and the like, thereby reinforcing the formation. A resin component is predominantly used.

Specific examples of known resins include phenol resin, epoxy resin, unsaturated alkyd resin, polystyrene and rubber. The binder is preferably a material having a rubber elasticity (hereinafter referred to as rubber elastic body), having properties of repulsing the distortion and recovering the original shape when distortion is imposed, and having a melting range (softening point) of 330° C. or less. The "melting range" as used herein means a temperature range where a polymer such as resin is known to melt, because the polymer is multimolecular and not fixed in melting point. In some rubber elastic bodies, the melting point is not known (see, *Nippon Gum Kyokai Shi* (*Journal of Tapan Rubber Society*), 52, No. 11, 701 (1979)); however, those which decrease in internal frictional resistance and increase in the fluidity in the temperature range of 330° C. or less are preferred. Among these rubber elastic bodies, preferred are materials which can swell or suspend in a solvent in the practical embodiment and exhibit excellent heat resistance in a reflow soldering treatment at the production of a capacitor.

Specific examples of the material having such properties include isoprene rubber, butadiene rubber, styrene/butadiene rubber, nitrile rubber, butyl rubber, ethylene/propylene copolymer (e.g., EPM, EPDM), acrylic rubber, polysulfide rubber, fluorine-containing polymer, silicone rubber and other thermoplastic elastomers. Among these, preferred are EPM, EPDM and fluorine-containing polymer. The fluorine-containing polymer is a polymer containing a fluorine atom but the number of fluorine atoms contained in the monomer constituting the polymer is not particularly limited.

These rubber elastic bodies are low in the modulus of elasticity and water absorptivity compared with epoxy resin generally used for electrically conducting carbon paste, and exhibit an effect in relaxing the stress in the bonded portion. Examples of the fluorine-containing polymer include, but are not limited to, polytetrafluoroethylene, poly(chlorofluoroethylene), a binary copolymer of vinylidene fluoride (VDF) and hexafluoropropylene (HFP), a ternary copolymer of vinylidene fluoride, hexafluoropropylene and tetrafluoroethylene, a copolymer containing tetrafluoroethylene, a tetrafluoroethylene/propylene copolymer, polyvinylidene fluoride, polyvinyl fluoride, fluorine-containing acrylate rubber and fluorine-containing silicone rubber. Examples of specific products include Viton (registered trademark, produced by Du Pont Dow elastomers) and Aflas (registered trademark, produced by Asahi Glass).

The solvent used in the electrically conducting carbon paste may be a solvent used for normal electrically conducting carbon pastes. For examples, solvents such as N-methylpyrrolidone, N,N-dimethylacetamide, dimethylformamide and butyl acetate are used individually or in combination. The amount of the solvent blended in the electrically conducting carbon paste must be adjusted to give a viscosity so that the binder is not inhibited from infiltrating into the inside of the solid electrolyte layer and into the inside of fine pores of a valve-acting metal (for example, etched aluminum foil) according to the end use of the electrically conducting paste. Usually, the solvent is used in an amount of 0.5 to 10 times equivalent to the solid contents of the paste.

The blending ratio of the electrically conducting material and the binder resin in the electrically conducting carbon paste is such that the electrically conducting material occupies from 30 to 99% by mass, preferably from 50 to 90% by mass, and the binder resin occupies from 1 to 70% by mass, per mass of all solid contents. If the ratio of the electrically conducting material is less than 30% by mass, the electrically conducting carbon paste excessively decreases in electrical conductivity, whereas if the ratio exceeds 99% by mass, the adhesive property and the stress relaxing property of the electrically conducting metal powder paste layer formed thereon are lost.

The electrically conducting metal powder for use in the electrically conducting metal powder paste may be a metal powder, other than silver powder, such as gold or copper, or a carbon powder, however, silver powder is most preferred and the silver powder preferably occupies 80% by mass or more of the entire filler. The particle size of the powder is preferably, in terms of an average particle size, from 1 to 10 μm. If the average particle size is less than 1 μm, the bulk density is small, and as a result, the volume of the paste increases, which is disadvantageous in the formation of the electrically conducting layer. Whereas if the average particle size exceeds 10 μm, the particles are excessively coarse and failure in connection to the cathode lead terminal readily occurs.

For forming an electrically conducting polymer on the dielectric oxide film in the production of a solid electrolytic capacitor, a solution chemical oxidation polymerization method, a gas phase chemical oxidation polymerization method, an electrolytic polymerization and the like are used. However, depending on the intensity of the surface tension of the solution, the coatability of the electrically conducting polymer to oxide film may be affected and the solid electrolyte layer may be inhibited from forming inside the dielectric film. For example, in solution chemical oxidation polymerization, a monomer is oxidatively polymerized on a dielectric film having fine pores on an anode substrate in the presence of a compound capable of donating a dopant in the presence of an oxidizing agent and moisture in air, and the generated polymer composition is formed as a solid electrolyte on the dielectric material surface. This production process is repeated once or more, preferably from 3 to 30 times, per anode substrate, whereby a solid electrolyte having a lamellar structure and having a space portion between layers can be easily formed. The presence of the space portion between layers of the lamellar structure plays an important role in the properties of the solid electrolytic capacitor of the present invention. Specifically, it is considered that the binder of the electrically conducting carbon paste can infiltrate into the space portion between the layers, and therefore, the adhesive property of the electrically conducting material to the dielectric film and the solid electrolyte is improved. As a result, a solid electrolytic capacitor having mechanical strength, high capacitance, low impedance, good humidity resistance load property and excellent heat resistance can be obtained.

One preferred embodiment of the production process of the present invention contains a step of dipping the valve-acting metal anode foil having formed thereon a dielectric film layer in a solution containing an oxidizing agent (Solution 1) and a step of dipping it in a solution containing a monomer and a dopant (Solution 2). The dipping steps may be performed in the order of dipping in Solution 1 and then dipping in Solution 2 (forward order) or may be performed in the reverse order of dipping the valve-acting metal anode foil in Solution 2 and then dipping it in Solution 1.

In another practical embodiment, the process may contain a step of dipping the valve-acting metal anode foil in a solution containing an oxidizing agent and a dopant (Solution 3) and a step of dipping it in a solution containing a monomer (Solution 4). Also in this case, the dipping steps may be performed in the order of dipping in Solution 3 and then dipping in Solution 4 (forward order) or in the reverse order of dipping in Solution 4 and then dipping in Solution 3. Solutions 1 to 4 each may be used in the state where respective components contained are suspended.

The dipping may be replaced by coating.

The solvents in Solutions 1 to 4 may be the same or different and according to the kind of solvent, a drying step may be separately interposed between the steps of dipping in Solution 1 and dipping in Solution 2 or between the steps of dipping in Solution 3 and dipping in Solution 4. Furthermore, a washing step using a solvent may be provided after the formation of the solid electrolyte.

Examples of the solvent for use in the production method of the present invention or the solvent for use in the washing after the formation of the solid electrolyte include ethers such as tetrahydrofuran (THF), dioxane and diethyl ether; ketones such as acetone and methyl ethyl ketone; aprotic polar solvents such as dimethylformamide, acetonitrile, benzonitrile, N-methylpyrrolidone (NMP) and dimethyl sulfoxide (DMSO); esters such as ethyl acetate and butyl acetate; non-aromatic chlorine-based solvents such as chloroform and methylene chloride; nitro compounds such as nitromethane, nitroethane and nitrobenzene; alcohols such as methanol, ethanol and propanol; organic acids such as formic acid, acetic acid and propionic acid; acid anhydride of these organic acids (for example, acetic anhydride); water; and a mixed solvent thereof. Among these, water, alcohols, ketones and a mixed system thereof are preferred.

The thus-produced solid electrolyte has an electric conductivity of about 0.1 to 200 S/cm, preferably from about 1 to 150 S/cm, more preferably from about 10 to 100 S/cm.

Examples of the electrically conducting polymer for forming the solid electrolyte used in the solid electrolytic capacitor of the present invention include electrically conducting polymers containing, as a repeating unit, a structure represented by a compound having a thiophene skeleton, a compound having a polycyclic sulfide skeleton, a compound having a pyrrole skeleton, a compound having a furan skeleton, or a compound having an aniline skeleton.

Among the monomers used as a starting material of the electrically conducting polymer, the compound having a thiophene skeleton include a compound represented by formula (I):

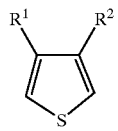

(wherein the substituents $R^1$ and $R^2$ each independently represents a monovalent group selected from the group consisting of hydrogen, a linear or branched, saturated or unsaturated hydrocarbon group having from 1 to 10 carbon atoms, an alkoxy group, an alkyl ester group, a halogen, a nitro group, a cyano group, a primary, secondary or tertiary amino group, $CF_3$, a phenyl group and a substituted phenyl group, the hydrocarbon chains of $R^1$ and $R^2$ may combine with each other at an arbitrary position to form a divalent chain for forming at least one 3-, 4-, 5-, 6- or 7-membered saturated or unsaturated hydrocarbon ring structure together with the carbon atoms to which those hydrocarbon groups are substituted, and the ring connecting chain may arbitrarily contain a bond of carbonyl, ether, ester, amide, sulfido, sulfinyl, sulfonyl or imino). Specific examples thereof include derivatives such as 3-methylthiophene, 3-ethylthiophene, 3-propylthiophene, 3-butylthiophene, 3-pentylthiophene, 3-hexylthiophene, 3-heptylthiophene, 3-octylthiophene, 3-nonylthiophene, 3-decylthiophene, 3-fluorothiophene, 3-chlorothiophene, 3-bromothiophene, 3-cyanothiophene, 3,4-dimethylthiophene, 3,4-diethylthiophene, 3,4-butylenethiophene, 3,4-methylenedioxythiophene and 3,4-ethylenedioxythiophene. These compounds are commercially available or may be prepared by a known method (described, for example, in *Synthetic Metals*, Vol. 15, page 169 (1986)).

Examples of the compound having a polycyclic sulfide skeleton include a compound represented by the following formula (II):

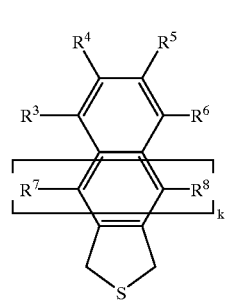

(wherein the substituents $R^3$, $R^4$, $R^5$, $R^6$, $R^7$ and $R^8$ each independently represents a divalent group selected from the group consisting of a hydrogen atom, a linear or branched, saturated or unsaturated hydrocarbon group having from 1 to 10 carbon atoms, an alkoxy group, an alkyl ester group, a halogen, a nitro group, a cyano group, a primary, secondary or tertiary amino group, $CF_3$, a phenyl group and a substituted phenyl group, the hydrocarbon chains of $R^3$, $R^4$, $R^5$, $R^6$, $R^7$ and $R^8$ may combine with each other at an arbitrary position to form a divalent chain for forming at least one 3-, 4-, 5-, 6- or 7-membered saturated or unsaturated hydrocarbon ring structure together with the carbon atoms to which those hydrocarbon groups are substituted, the ring connecting chain may arbitrarily contain a bond of carbonyl, ether, ester, amide, sulfido, sulfinyl, sulfonyl or imino, k represents the number of condensed rings surrounded by the thiophene ring and the benzene ring having the substituents $R^3$ to $R^6$ and is an integer of 0 to 3, and the condensed ring in the formula may arbitrarily contain nitrogen or N-oxide, with the proviso that the substituents $R^3$ to $R^6$ are deducted by the number of nitrogen or N-oxide).

Specific examples of the compound having a polycyclic sulfide skeleton which can be used include a compound having a 1,3-dihydro-polycyclic-sulfide (also called 1,3-dihydrobenzo[c]thiophene) skeleton and a compound having a 1,3-dihydronaphtho[2,3-c]thiophene skeleton. In addition, a compound having a 1,3-dihydroanthra[2,3-c]thiophene skeleton and a compound having a 1,3-dihydronaphthaceno[2,3-c]thiophene skeleton may be used. These compounds can be prepared by a known method, for example, by the method described in JP-A-8-3156.

Furthermore, for example, a compound having a 1,3-dihydronaphtho[1,2-c]thiophene skeleton, a 1,3-dihydrophenanthra[2,3-c]thiophene derivative, a compound having a 1,3-dihydrotriphenylo[2,3-c]thiophene skeleton and a 1,3-dihydrobenzo[a]anthraceno[7,8-c]thiophene derivative may also be used.

A compound arbitrarily containing nitrogen or N-oxide in the condensed ring may also be used and examples thereof include 1,3-dihydrothieno[3,4-b]quinoxaline, 1,3-dihydrothieno[3,4-b]quinoxaline-4-oxide and 1,3-dihydrothieno[3,4-b]quinoxaline-4,9-dioxide. However, the present invention is not limited thereto.

Examples of the compound having a pyrrole skeleton include a compound represented by the following formula (III):

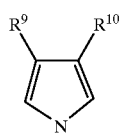

(III)

(wherein the substituents $R^9$ and $R^{10}$ each independently represents a monovalent group selected from the group consisting of a hydrogen atom, a linear or branched, saturated or unsaturated hydrocarbon group having from 1 to 10 carbon atoms, an alkoxy group, an alkyl ester group, a halogen, a nitro group, a cyano group, a primary, secondary or tertiary amino group, $CF_3$, a phenyl group and a substituted phenyl group, the hydrocarbon chains of $R^9$ and $R^{10}$ may combine with each other at an arbitrary position to form a divalent chain for forming at least one 3-, 4-, 5-, 6- or 7-membered saturated or unsaturated hydrocarbon ring structure together with the carbon atoms to which those hydrocarbon groups are substituted, and the ring connecting chain may arbitrarily contain a bond of carbonyl, ether, ester, amido, sulfido, sulfinyl, sulfonyl or imino).

Specific examples thereof include derivatives such as 3-methylpyrrole, 3-ethylpyrrole, 3-propylpyrrole, 3-butylpyrrole, 3-pentylpyrrole, 3-hexylpyrrole, 3-heptylpyrrole, 3-octylpyrrole, 3-nonylpyrrole, 3-decylpyrrole, 3-fluoropyrrole, 3-chloropyrrole, 3-bromopyrrole, 3-cyanopyrrole, 3,4-dimethylpyrrole, 3,4-diethylpyrrole, 3,4-butylenepyrrole, 3,4-methylenedioxypyrrole and 3,4-ethylenedioxypyrrole. These compounds are commercially available or may be prepared by a known method.

Examples of the compound having a furan skeleton include a compound represented by the following formula (IV):

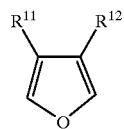

(IV)

(wherein the substituents $R^{11}$ and $R^{12}$ each independently represents a monovalent group selected from the group consisting of a hydrogen atom, a linear or branched, saturated or unsaturated hydrocarbon group having from 1 to 10 carbon atoms, an alkoxy group, an alkyl ester group, a halogen, a nitro group, a cyano group, a primary, secondary or tertiary amino group, $CF_3$, a phenyl group and a substituted phenyl group, the hydrocarbon chains of $R^{11}$ and $R^{12}$ may combine with each other at an arbitrary position to form a divalent chain for forming at least one 3-, 4-, 5-, 6- or 7-membered saturated or unsaturated hydrocarbon ring structure together with the carbon atoms to which those hydrocarbon groups are substituted, and the ring connecting chain may arbitrarily contain a bond of carbonyl, ether, ester, amido, sulfido, sulfinyl, sulfonyl or imino).

Specific examples thereof include derivatives such as 3-methylfuran, 3-ethylfuran, 3-propylfuran, 3-butylfuran, 3-pentylfuran, 3-hexylfuran, 3-heptylfuran, 3-octylfuran, 3-nonylfuran, 3-decylfuran, 3-fluorofuran, 3-chlorofuran, 3-bromofuran, 3-cyanofuran, 3,4-dimethylfuran, 3,4-diethylfuran, 3,4-butylenefuran, 3,4-methylenedioxyfuran and 3,4-ethylenedioxyfuran, however, the present invention is not limited thereto. These compounds are commercially available or may be prepared by a known method.

Examples of the compound having an aniline skeleton include a compound represented by the following formula (V):

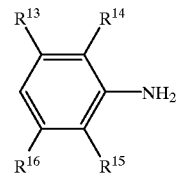

(V)

(wherein the substituents $R^{13}$, $R^{14}$, $R^{15}$ and $R^{16}$ each independently represents a monovalent group selected from the group consisting of a linear or branched, saturated or unsaturated hydrocarbon group having from 1 to 10 carbon atoms, an alkoxy group, an alkyl ester group, a halogen, a nitro group, a cyano group, a primary, secondary or tertiary amino group, $CF_3$, a phenyl group and a substituted phenyl group, the hydrocarbon chains of $R^{13}$, $R^{14}$, $R^{15}$ and $R^{16}$ may combine with each other at an arbitrary position to form a divalent chain for forming at least one 3-, 4-, 5-, 6- or 7-membered saturated or unsaturated hydrocarbon ring structure together with the carbon atoms to which those hydrocarbon groups are substituted, and the ring connecting chain may arbitrarily contain a bond of carbonyl, ether, ester, amido, sulfido, sulfinyl, sulfonyl or imino).

Specific examples thereof include derivatives such as 2-methylaniline, 2-ethylaniline, 2-propylaniline, 2-butylaniline, 2-pentylaniline, 2-hexylaniline, 2-heptylaniline, 2-octylaniline, 2-nonylaniline, 2-decylaniline, 2-fluoroaniline, 2-chloroaniline, 2-bromoaniline, 2-cyanoaniline, 2,5-dimethylaniline, 2,5-diethylaniline, 2,3-butyleneaniline, 2,3-methylenedioxyaniline and 2,3- ethylenedioxyaniline, however, the present invention is not limited thereto. These compounds are commercially available or may be prepared by a known method.

The compounds selected from the above-described compounds may be used in combination and the copolymer may form the solid electrolyte. At this time, the compositional ratio of the polymerizable monomers depends on the polymerization conditions and the like. However, the preferred compositional ratio and polymerization conditions may be confirmed by a simple test. For example, a method where the 3,4-ethylenedioxythiophene monomer and an oxidizing agent, preferably in the form of a solution, are separately or simultaneously coated one after another on the oxide film layer of the metal foil may be used (see, JP-A-2-15611 and JP-A-10-32145). In general, for the electrically conducting polymer, an aryl sulfonate-based dopant, for example, a salt of benzenesulfonic acid, toluenesulfonic acid, naphthalenesulfonic acid, anthrcene-sulfonic acid or anthraquinonesulfonic acid, may be used.

In order to allow the binder of the electrically conducting carbon paste to infiltrate into the solid electrolyte layer or into both the solid electrolyte and the inside of pores of the dielectric film, the following methods may be used:

(1) a method of directly dipping a device after the formation of a solid electrolyte layer of an electrically conducting polymer in an electrically conducting paste solution to use the osmotic pressure, (2) a method of injecting the electrically conducting paste solution at the time of outer jacket molding through a step of heating and/or applying a pressure in the process of producing a solid electrolytic capacitor, or (3) a method of allowing the binder to infiltrate into the inside in the heating step at the time of inspection and evaluation such as evaluation of reflow soldering heat resistance or heat cycle characteristics, in the inspection for selecting defective products (debugging step).

By any of these operations, the binder can be allowed to infiltrate into the inside of the foil.

Whether or not the binder is allowed to infiltrate into the inside of the solid electrolyte layer formed on the surface of the valve-acting metal or into both the solid electrolyte layer formed on the surface of the valve-acting metal and the dielectric film may be easily confirmed by disorganizing the product capacitor, analyzing the adhesion between the foil and the solid electrolyte layer, and observing the state how the viscous polymer is drawn out from the inside of the foil.

The thus-obtained solid electrolytic capacitor having the above-described electrically conducting paste layer formed on a solid electrolyte having a lamellar structure and a space portion between the layers, exhibits excellent capabilities. The reason therefor is considered to be that the binder infiltrates into the solid electrolyte layer formed of an electrically conducting polymer or into both the solid electrolyte layer and the inside of the fine pores of the valve-acting metal (for example, etched aluminum foil) and exerts an anchoring effect. As a result, the adhesive property is improved and excellent capability of relaxing the external stress on the electrode, high heat resistance, low ESR and impedance, small thermal deterioration of the impedance and superior moisture resistance are exhibited.

EXAMPLES

The present invention is described in greater detail below by referring to the Examples, however, the present invention should not be construed as being limited thereto. Unless otherwise indicated herein, all parts, percents, ratios and the like are by weight.

Example 1

A butyl acetate suspension of Viton SVX (registered trademark, produced by Du Pont Dow elastomers, a copolymer of vinylidene fluoride, propylene hexafluoride and ethylene tetrafluoride, specific gravity: 1.85, secondary transition temperature (Tg): about −16° C., Mooney viscosity (at 121° C.): 110) as a binder resin was charged into 100 parts by mass of an artificial graphite powder (UFG-5, produced by Showa Denko K.K.), as an electrically conducting material, having an aspect ratio of 1.5 to 3, an average particle size of 3 μm and a fixed carbon content of 99% by mass and containing 2% by mass or less of particles having a particle size of 32 μm or more, so that the resin, in terms of the solid contents accounted for 70 parts by mass per 100 parts by mass of the artificial graphite powder. The resulting suspension was stirred for 24 hours to manufacture an electrically conducting carbon paste.

Then, an etched aluminum foil having a specified capacitance of 119° F./cm$^2$ was cut into 3 mm×10 mm, and on both surfaces thereof, a polyimide solution was circumferentially coated to a width of 1 mm to divide the long axis direction into 4 mm and 5 mm and dried to form a masking. The 3 mm×4 mm portion of this etched aluminum foil was again chemically formed with an aqueous 10 mass % ammonium adipate solution by applying a voltage of 13 V, thereby forming a dielectric oxide film on the cut out portion. Subsequently, the 3 mm×4 mm portion of this aluminum foil was dipped with 1.2 mol/l of an isopropyl alcohol solution having dissolved therein 5 g of 3,4-ethylenedioxythiophene (Baytron (registered trademark) M, produced by Bayer A.G.) and then dipped in 2 mol/l of an aqueous ammonium sulfate solution prepared so that sodium 2-anthraquinonesulfonate suspended became 0.07% by mass. Thereafter, this aluminum foil was left standing in air at about 40° C. for about 10 minutes and thereby oxidatively polymerized. These dipping step and polymerization step were repeated 25 times in total to form a solid electrolyte layer of electrically conducting polymer in the inside of fine pores of the etched aluminum foil and on the outer surface of the foil. The finally produced poly(3,4-ethylenedioxythiophene) was washed in warm water at 50° C. and then dried at 100° C. for 30 minutes, thereby forming the solid electrolyte layer.

The cross section of the aluminum foil having formed thereon an electrically conducting polymer layer, as above, was examined through a scanning electron microscope (SEM) (magnification: 10,000 times). As a result, it was confirmed that, as shown in FIG. 1, an electrically conducting polymer layer in the lamellar structure covered up the surface in the inside of the fine pores of the dielectric material (alumina) on the metal aluminum and a space portion was present between the layered electrically conducting polymer layers. The thickness of the electrically conducting polymer layer formed on the outer surface of the fine pore structure was about 5 μm and the layers constituting the lamellar structure had a thickness of about 0.1 to 0.3 μm per layer. Thereafter, on the portion of the aluminum foil where the electrically conducting polymer layer was formed, the electrically conducting carbon paste manufactured above was coated, and then heat-treated at 100° C. for 30 minutes to form an electrically conducting layer of carbon paste on the electrically conducting polymer. Subsequently, a silver paste was applied to connect a cathode lead terminal and an anode lead terminal was connected by welding to the portion where the electrically conducting polymer layer was not formed. The thus-obtained device was pressure-molded with epoxy resin and aged at 125° C. for 2 hours while applying a rated voltage. In this way, 60 units in total of capacitors were completed.

Figure 2:
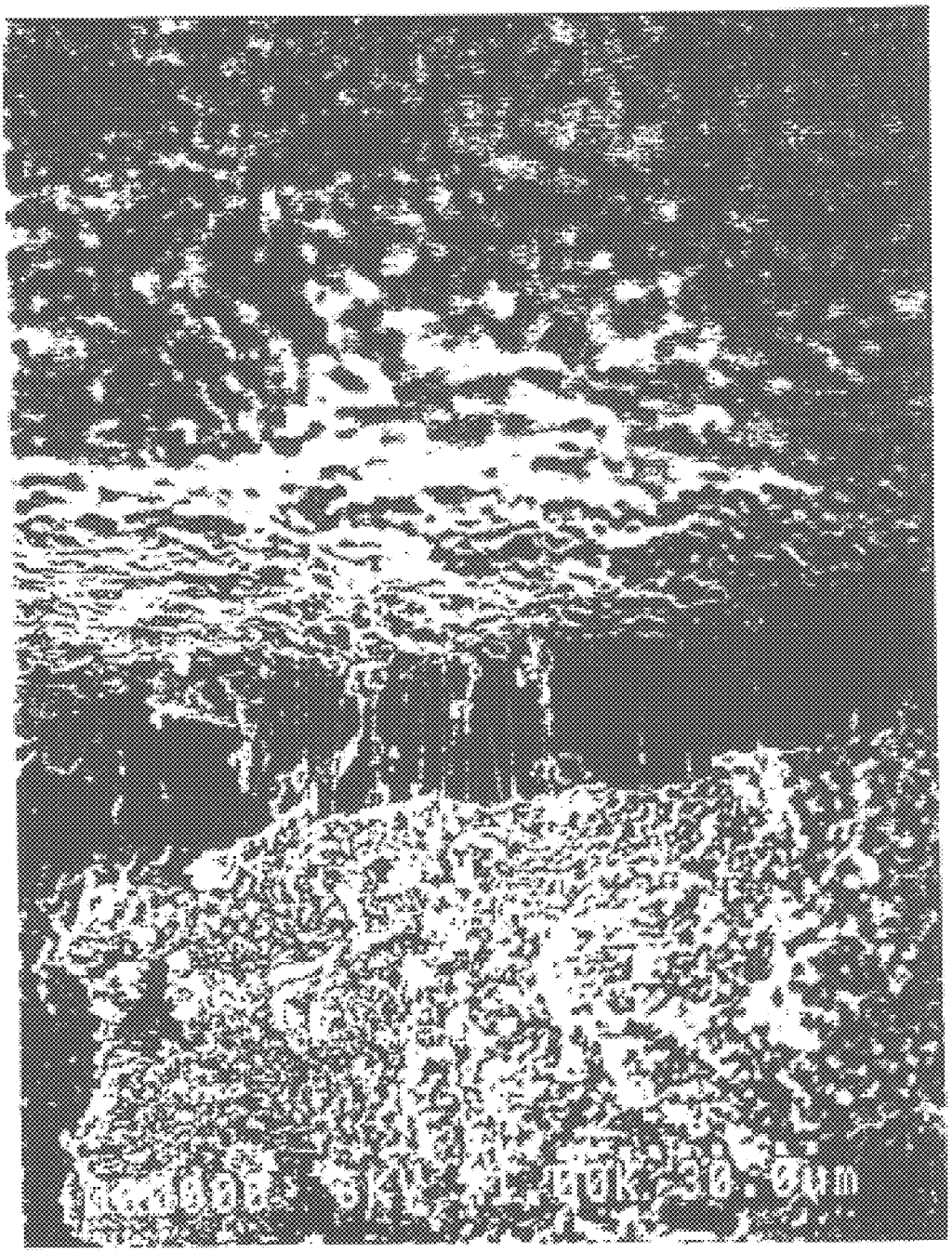
FIG. 2 is a SEM photograph (×10,000) showing the invasion of the binder resin at the boundary between the solid electrolyte and the outer surface of the foil.

One unit randomly selected therefrom was disorganized, the device was broken and the boundary between the solid electrolyte and the outer surface of the foil was observed. As a result, as shown in FIG. 2, a viscous stringlike polymer was observed. Furthermore, a secondary distribution state of a specific element (fluorine element) was observed by a mapping method using an electron probe microanalyzer (EPMA). As a result, it was found that the binder resin was allowed to infiltrate into the inside of the solid electrolyte layer and into the inside of the pores on the dielectric film surface.

In addition, from the capacitors manufactured above, 30 units of capacitor devices were randomly selected and measured on the initial properties, namely, capacitance and loss factor (tan δ) at 120 Hz, the impedance at a resonance frequency, and the leakage current. The leakage current was measured 1 minute after the rated voltage was applied. The average values of these measured values, the defective ratio (when a device having a leakage current of 0.59 μA (0.002 CV) or more was rated defective), and the number of shorted products are shown in Table 1. The average value of the leakage current was a value calculated excluding the defective products. Also, the results in the reflow soldering test and the moisture resistance test performed subsequently thereto are shown in Table 2. In the reflow soldering test, the device was passed through a temperature region at 230° C. over 30 seconds, a rated voltage (6.3 V) was applied thereto, the leakage current was measured after 1 minute, and a device having a leakage current of less than 3 μA was rated non-defective. In the moisture resistance test, the device was left standing at a high temperature and a high humidity of 85° C. and 85% RH for 240 hours, then a rated voltage (6.3 V) was applied thereto, and after 1 minute, the leakage current was measured. In this moisture resistance test, a device having a leakage current of less than 11.8 μA (0.04 CV) was rated non-defective.

Example 2

30 Units of capacitors were completed in the same manner as in Example 1 except that the ammonium persulfate was replaced by ferric sulfate and the 3,4-ethylenedioxythiophene was replaced by 1,3-dihydroisothianaphthene. The properties of these capacitor devices were evaluated in the same manner as in Example 1 and the results obtained are shown in Tables 1 and 2.

Example 3

30 Units of capacitors were completed in the same manner as in Example 1 except that the 3,4-ethylenedioxythiophene was replaced by pyrrole. The properties of these capacitor devices were evaluated in the same manner as in Example 1 and the results obtained are shown in Tables 1 and 2.

Example 4

30 Units of capacitors were completed in the same manner as in Example 1 except that the 3,4-ethylenedioxythiophene was replaced by furan. The properties of these capacitor devices were evaluated in the same manner as in Example 1 and the results obtained are shown in Tables 1 and 2.

Example 5

30 Units of capacitors were completed in the same manner as in Example 1 except that the 3,4-ethylenedioxythiophene was replaced by aniline. The properties of these capacitor devices were evaluated in the same manner as in Example 1 and the results obtained are shown in Tables 1 and 2.

Comparative Example 1

30 Units in total of capacitors were completed and the properties were evaluated in the same manner as in Example 1, except that the binder resin, which is an epoxy resin, was replaced by EPICOTE 828 (registered trademark, produced by Yuka Shell Epoxy, specific gravity: 1.17, melting point (Duran's mercury method): 8 to 12° C., viscosity (at 25° C.): 120 to 150 poises).

TABLE 1

| | Initial Properties | | | | | |
|---|---|---|---|---|---|---|
| | Capacitance, μF | Loss Factor, % | Impedance, mΩ | Leakage Current, μA | Defective Ratio | Number of Shorted Devices |
| Example 1 | 51.9 | 6.03 | 0.008 | 0.03 | 0/30 | 0 |
| Example 2 | 50.3 | 6.35 | 0.013 | 0.05 | 0/30 | 0 |
| Example 3 | 50.9 | 6.24 | 0.012 | 0.06 | 0/30 | 0 |
| Example 4 | 49.8 | 6.53 | 0.017 | 0.07 | 0/30 | 0 |
| Example 5 | 49.6 | 6.78 | 0.019 | 0.09 | 0/30 | 0 |
| Comparative Example 1 | 50.1 | 9.45 | 0.017 | 0.21 | 1/30 | 0 |

TABLE 2

| | Reflow Soldering Test | | Moisture Resistance Test | | |
|---|---|---|---|---|---|
| | Defective Ratio | Number of Shorted Devices | Leakage Current | Defective Ratio | Number of Shorted Devices |
| Example 1 | 0/30 | 0 | 0.49 | 0/30 | 0 |
| Example 2 | 0/30 | 0 | 0.54 | 0/30 | 0 |
| Example 3 | 0/30 | 0 | 0.59 | 0/30 | 0 |
| Example 4 | 0/30 | 0 | 0.57 | 0/30 | 0 |
| Example 5 | 0/30 | 0 | 0.61 | 0/30 | 0 |
| Comparative Example 1 | 1/29 | 1 | 3.49 | 4/28 | 2 |

In the present invention, the binder constituting the electrically conducting paste is allowed to infiltrate into the solid electrolyte layer formed on the dielectric film on the surface of a valve-acting metal or into both the solid electrolyte layer formed on the dielectric film on the surface of a valve-acting metal and the inside of the pores of the valve-acting metal porous body, whereby the adhesion of the electrically conducting paste layer to the dielectric film and to the solid electrolyte, and the mechanical strength are enhanced. According to the present invention, a solid electrolytic capacitor having high capacitance, low impedance, good humidity resistance load characteristics and excellent heat resistance can be obtained.

While the invention has been described in detail and with reference to specific embodiments thereof, it will be apparent to one skilled in the art that various changes and modifications can be made therein without departing from the spirit and scope thereof.

What is claimed is:

1. A solid electrolytic capacitor comprising a dielectric film on the surface of a valve-acting metal having fine pores, a solid electrolyte layer having a lamellar structure with a space portion provided between layers, an electrically conducting carbon paste layer and an electrically conducting metal powder paste layer in order, wherein said electrically conducting carbon paste layer comprises a binder having a rubber elasticity in an electrically conducting carbon paste, and the binder is allowed to infiltrate into the solid electrolyte layer having a lamellar structure with a space portion provided between layers.

2. A solid electrolytic capacitor comprising a dielectric film on the surface of a valve-acting metal having fine pores, a solid electrolyte layer having a lamellar structure with a space portion provided between layers, an electrically conducting carbon paste layer and an electrically conducting metal powder paste layer in order, wherein said electrically conducting carbon paste layer comprises a binder having a rubber elasticity in an electrically conducting carbon paste, and the binder is allowed to infiltrate into the solid electrolyte layer having a lamellar structure with a space portion provided between layers and into the inside of the fine pores of the valve-acting metal.

3. The solid electrolytic capacitor as claimed in claim 1 or 2, wherein the binder of the electrically conducting carbon paste comprises a material which is softened at a temperature of 330° C. or less, can swell or suspend in the solvent of the paste and has rubber elasticity.

4. The solid electrolytic capacitor as claimed in claim 3, wherein the material having rubber elasticity is at least one material selected from the group consisting of isoprene rubber, butadiene rubber, styrene/butadiene rubber, nitrile rubber, butyl rubber, ethylene/propylene copolymer, acrylic rubber, polysulfide rubber, fluorine-containing polymer, silicone rubber and thermoplastic elastomer.

5. The solid electrolytic capacitor as claimed in claim 1 or 2, wherein the electrically conducting carbon paste comprises solid contents in an amount of from 30 to 99% by mass of an electrically conducting carbon material and the binder from 1 to 70% by mass.

6. The solid electrolytic capacitor as claimed in claim 5, wherein the electrically conducting carbon material is a material containing 80% by mass or more of artificial graphite.

7. The solid electrolytic capacitor as claimed in claim 6, wherein the artificial graphite has a fixed carbon content of 97% by mass or more, an average particle size of 1 to 13 µm and an aspect ratio of 10 or less, and contains 12% by mass or less of particles having a particle size of 32 µm or more.

8. The solid electrolytic capacitor as claimed in claim 1 or 2, wherein at least a part of said solid electrolyte layer has a lamellar structure.

9. The solid electrolytic capacitor as claimed in claim 8, wherein said solid electrolyte layer has a space portion at least in a position between layers of the lamellar structure.

10. The solid electrolytic capacitor as claimed in claim 8, wherein the solid electrolyte having a lamellar structure has a thickness of 0.1 to 0.3 µm per layer.

11. The solid electrolytic capacitor as claimed in claim 1 or 2, wherein the valve-acting metal is selected from the group consisting of aluminum, tantalum, niobium, titanium, zirconium and alloys thereof.

12. The solid electrolytic capacitor as claimed in claim 1 or 2, wherein the solid electrolyte layer comprises an electrically conducting polymer and a monomer for forming said electrically conducting polymer is a compound containing a 5-membered heterocyclic ring.

13. The solid electrolytic capacitor as claimed in claim 1 or 2, wherein the solid electrolyte layer comprises an electrically conducting polymer and a monomer for forming said electrically conducting polymer is a compound having an aniline skeleton.

14. The solid electrolytic capacitor as claimed in claim 12, wherein the compound containing a 5-membered heterocyclic ring is a compound selected from the group consisting of pyrrole, thiophene, furan, polycyclic sulfide and substitution derivatives thereof.

15. A solid electrolytic capacitor, comprising a dielectric film on the surface of a valve-acting metal having fine pores, a solid electrolyte layer, an electrically conducting carbon paste layer and an electrically conducting metal powder paste layer in order, wherein the binder of said electrically conducting carbon paste is allowed to infiltrate into the solid electrolyte layer, wherein the solid electrolyte layer comprises an electrically conducting polymer and a monomer for forming said electrically conducting polymer is a compound containing a 5-membered heterocyclic ring, wherein the compound containing a 5-membered heterocyclic ring is a compound selected from the group consisting of pyrrole, thiophene, furan, polycyclic sulfide and substitution derivatives thereof, and wherein the compound containing a 5-membered heterocyclic ring is a compound represented by the following formula (I):

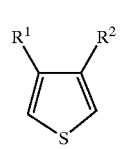

(I)

wherein the substituents $R^1$ and $R^2$ each independently represents a monovalent group selected from the group consisting of hydrogen, a linear or branched, saturated or unsaturated hydrocarbon group having from 1 to 10 carbon atoms, an alkoxy group, an alkyl ester group, a halogen, a nitro group, a cyano group, a primary, secondary or tertiary amino group, $CF_3$, a phenyl group and a substituted phenyl group; the hydrocarbon chains of $R^1$ and $R^2$ may combine with each other at an arbitrary position to form a divalent chain for forming at least one 3-, 4-, 5-, 6- or 7-membered saturated or unsaturated hydrocarbon ring structure together with the carbon atoms to which those hydrocarbon groups are substituted, and said ring connecting chain may arbitrarily contain a bond of carbonyl, ether, ester, amide, sulfido, sulfinyl, sulfonyl or imino.

16. The solid electrolytic capacitor as claimed in claim 15, wherein the compound containing a 5-membered heterocyclic ring is a compound selected from the group consisting of 3,4-ethylenedioxythiophene and 1,3-dihydroisothianaphthene.

17. A solid electrolytic capacitor comprising a dielectric film on the surface of a valve-acting metal having fine pores, a solid electrolyte layer, an electrically conducting carbon paste layer and an electrically conducting metal powder paste layer in order, wherein the binder of said electrically conducting carbon paste is allowed to infiltrate into the solid electrolyte layer and into the inside of the fine pores of the valve-acting metal, wherein the solid electrolyte layer comprises an electrically conducting polymer and a monomer for forming said electrically conducting polymer is a compound containing a 5-membered heterocyclic ring, wherein the compound containing a 5-membered heterocyclic ring is a compound selected from the group consisting of pyrrole, thiophene, furan, polycyclic sulfide and substitution derivatives thereof, and wherein the compound containing a 5-membered heterocyclic ring is a compound represented by the following formula (I):

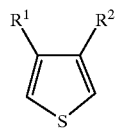
(I)

wherein the substituents $R^1$ and $R^2$ each independently represents a monovalent group selected from the group consisting of hydrogen, a linear or branched, saturated or unsaturated hydrocarbon group having from 1 to 10 carbon atoms, an alkoxy group, an alkyl ester group, a halogen, a nitro group, a cyano group, a primary, secondary or tertiary amino group, $CF_3$, a phenyl group and a substituted phenyl group; the hydrocarbon chains of $R^1$ and $R^2$ may combine with each other at an arbitrary position to form a divalent chain for forming at least one 3-, 4-, 5-, 6 - or 7-membered saturated or unsaturated hydrocarbon ring structure together with the carbon atoms to which those hydrocarbon groups are substituted, and said ring connecting chain may arbitrarily contain a bond of carbonyl, ether, ester, amide, sulfido, sulfinyl, sulfonyl or imino.

18. The solid electrolytic capacitor as claimed in claim 17, wherein the compound containing a 5-membered heterocyclic ring is a compound selected from the group consisting of 3,4-ethylenedioxythiophene and 1,3-dihydroisothianaphthene.

* * * * *